United States Patent
Brown (10) Patent No.: US 7,290,676 B1
(45) Date of Patent: Nov. 6, 2007

(54) SECONDARY CONTAINMENT SYSTEM FOR LIQUID STORAGE TANK

(76) Inventor: Troy Alan Brown, 13243 SW. 39th St., Davie, FL (US) 33330

( * ) Notice: Subject to any disclaimer, the term of this patent is extended or adjusted under 35 U.S.C. 154(b) by 0 days.

(21) Appl. No.: 11/553,266

(22) Filed: Oct. 26, 2006

Related U.S. Application Data (63) Continuation of application No. 10/730,181, filed on Dec. 8, 2003, now abandoned.

(51) Int. Cl.
*B65D 90/02* (2006.01)

(52) U.S. Cl. ............... 220/565; 220/567.1; 220/560.03

(58) Field of Classification Search ............... 220/4.12, 220/62.11, 62.18, 495.04, 560.1, 565, 567.1, 220/567.2, 592.27, 627, 745
See application file for complete search history.

(56) References Cited

U.S. PATENT DOCUMENTS

| | | | |
|---|---|---|---|
| 4,796,676 A | | 1/1989 | Hendershot et al. |
| 4,916,939 A | * | 4/1990 | Mogel .................. 73/49.2 |
| 5,072,623 A | | 12/1991 | Hendershot |
| 5,117,677 A | * | 6/1992 | Hendershot et al. ......... 73/49.2 |
| 5,167,142 A | | 12/1992 | Sharp |
| 5,269,436 A | * | 12/1993 | Bachmann ................ 220/62.2 |
| 5,397,020 A | | 3/1995 | Witt |
| 5,400,646 A | | 3/1995 | Kraus et al. |
| 5,494,183 A | | 2/1996 | Sharp |
| 5,597,948 A | | 1/1997 | Sharp |
| 6,206,226 B1 | * | 3/2001 | Coates ........................ 220/565 |

* cited by examiner

*Primary Examiner*—Anthony D. Stashick
*Assistant Examiner*—Harry A Grosso
(74) *Attorney, Agent, or Firm*—Scott D. Paul, Esq.; Steven M. Greenberg, Esq.; Carey Rodriguez Greenberg & Paul LLP (57) ABSTRACT

A lining system for a fluid containment vessel having an outer section with a floor surface and a vertical surface. The inner section is attached to the outer section so that interstitial space exists between the outer section and the inner section and a continuous negative pressure exists in the interstitial space. The floor surface is formed from a cost saving template. The vessel is divided into at least two independently sealed portions. The inner section includes a shell skirt that reaches a critical height within the vessel to reduce the effects of corrosion and to avoid stresses on the vertical surface. A flushing mechanism allows the area to be purged of any leaked material.

1 Claim, 8 Drawing Sheets

SECONDARY CONTAINMENT SYSTEM FOR LIQUID STORAGE TANK

BACKGROUND OF THE INVENTION

1. Field of the Invention

This invention relates to a lining system for a fluid containment vessel, and more particularly, to an easy to install, inexpensive system providing improved corrosion protection and enhanced monitoring and reporting ability for leakage.

2. Description of Related Art

Concern for environmental pollution has resulted in governmental requirements that certain chemicals stored in tanks must be guarded against leaking into the surroundings. For several liquids, federal, state and local regulations require double containment systems for the protection of groundwater.

For steel tanks, it is well known to protect tanks against corrosion by electrically isolating connecting piping of different metals to prevent the development of corrosive currents, by protectively coating the inside and outside of the steel tank with a coating material, by means of cathodic protection using a sacrificial anode to reverse corrosive underground current flow, and by placing an impressed current on the tank. Many steel tanks have a layer of sand between the outer tank and the inner tank for absorption of leaks, and for support of the inner tank against the outer tank.

Furthermore, it is known in the prior art to monitor corrosion by having a negative pressure between the inner tank and the outer tank. Often, because of the separation between the inner tank and the outer tank, the vacuum effect is less than the desired amount. It is therefore a need in the industry to have an improved monitoring system.

Some non-metallic liners are known to be used in the art. However, these liners do not make use of a metal's superior toughness, compression resistance and impact resistance.

SUMMARY OF THE INVENTION

The present invention provides a low cost, easy to install lining system for a fluid containment vessel, with enhanced corrosion resistance and life cycle and improved sensor and monitoring features.

In the present invention, the integrity of the outer section is preferably determined prior to the installation of the inner section. Repairs or modifications, or both, are made if required or desired to ensure the integrity of the outer section and to optimize the life cycle of the system.

The inner section includes a steel welded unit that fits directly above the outer section. The inner section is connected, preferably by continuous seal welding, to the outer section across the upper surface of the outer section. The inner section continues up the sides of the outer section at a critical height, which is determined as a function of the dimensions of each individual tank, according to specific engineering criteria. This attachment ensures that a minimum of stress is applied in the area between the connection of the inner section to the outer section and the bottom corner of the outer section.

The present system has the unexpected added advantage of obviating the sand pad that is normally found between the outer section and the inner section of a double walled tank. This pad is usually four to six inches in depth.

The present system also has the advantage of having a vacuum that serves the dual purpose of providing a mechanism for monitoring the tank system for leakage and reducing or eliminating the amount of oxygen and electrolyte (i.e. moisture) between the outer section and the inner section to mitigate or eliminate corrosion. Since the seal of the present invention is far superior to that of conventional designs, the present invention enables a stronger negative pressure and improved corrosion resistance.

In an alternative embodiment, the present invention provides a computerized sensor and monitoring system which immediately detects and reports a leak in either the vertical or horizontal interstitial space, or both. Moreover, the system provides for detection and reporting of a leak either between the inner and outer flooring of the tank system or below the outer flooring of the tank system.

In yet another embodiment, added corrosion protection is provided by an epoxy lining which isolates the inner section flooring from the product inside the tank system.

It is a part of this invention to provide superior toughness and puncture, impact and compression resistance versus flexible synthetic membranes.

It is also a part of this invention to provide a significantly reduced leak path potential for the vessel.

It is also part of this invention to provide an improved vacuum monitoring system which maintains a constant vacuum level on the interstitial space, monitors vacuum level changes, and produces an alarm if the interstitial space is breeched by a leak path between the inner and outer surface.

The monitoring system is preferably electrically powered and includes a vacuum sensor, a programmable logic controller which detects changes in vacuum pressure and an alarm system.

In accordance with these and other objects that will become apparent hereinafter, the instant invention will now be described with particular reference to the accompanying drawings.

DETAILED DESCRIPTION

Figure 1:
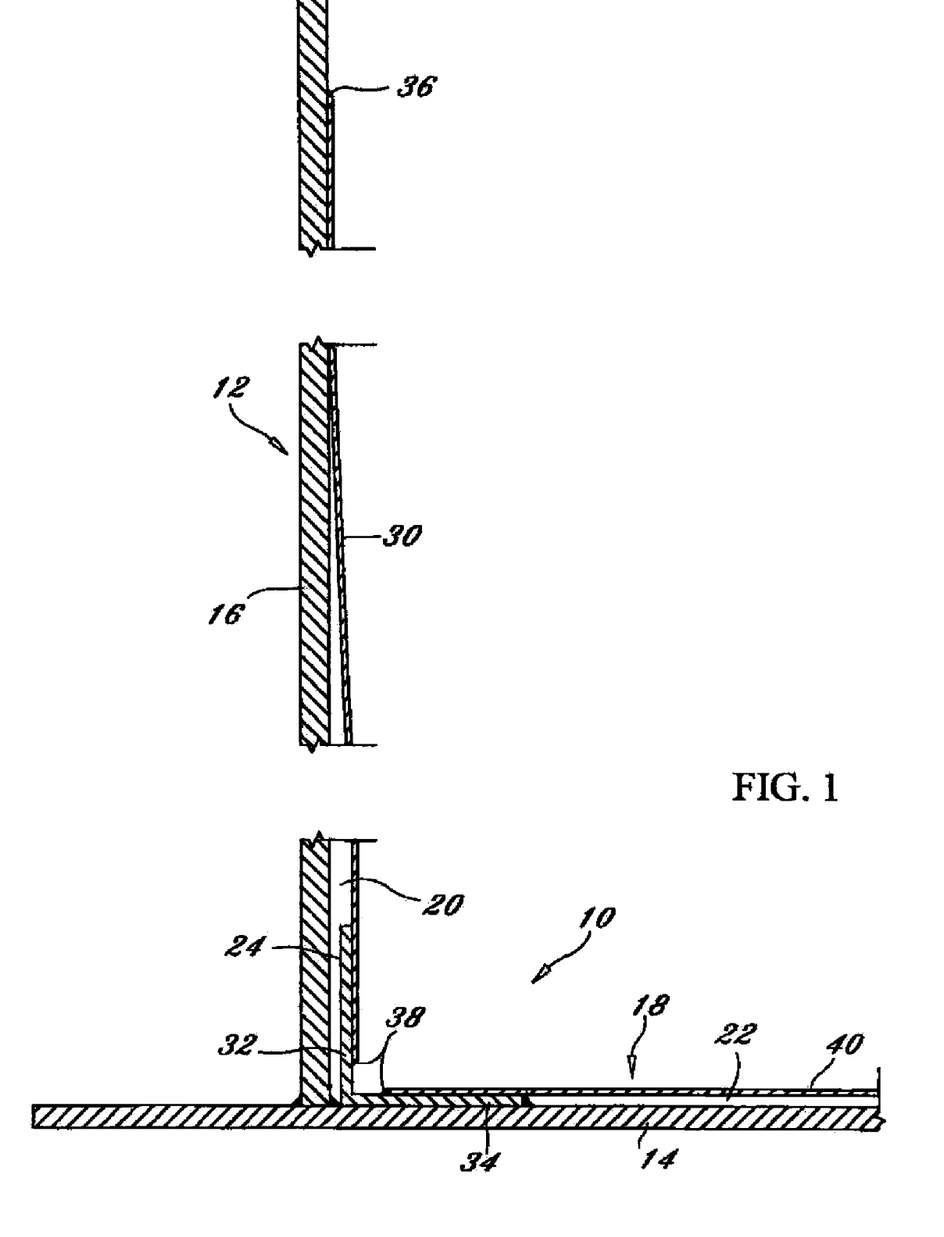
FIG. 1 shows a cutaway view of the perimeter of the system of the invention.

With reference to the drawings, FIGS. 1-9 depict a lining system for a fluid containment vessel generally indicated by the reference numeral 10 in FIG. 1. The vessel may be for above ground or underground storage. It may also be used for piping systems or any system which stores, carries or contains liquids, gases, chemicals or any other elements which need to be prevented from escaping into the environment. Also, the system may be used for refurbishments of tanks already constructed, either with or without an existing floor section. Throughout the figures, like referenced characters are used to indicate like elements.

Referring now to FIG. 1, this embodiment of the system includes an outer section, shown generally at 12, having a floor surface 14 and a vertical surface 16. The system also includes an inner section for lining, shown generally at 18. The inner section 18 interacts with the outer section 12, so that interstitial space or space areas 20,22 exist between the outer section 12 and the inner section 18. The interstitial space may be a volume which is generally vertical 20, generally horizontal 22, or, as is preferred, a single interstitial space traveling generally around the perimeter of the tanks, depending upon the attachment of the components. For example, one configuration of the components of the inner section 18 as described below allows for communication between the interstitial space areas 20,22 to generally form one interstitial space. Also, a vertical space and horizontal space may be connected by tubes or similar means.

It is within the interstitial space that a negative pressure is introduced. The negative pressure in the interstitial space serves to reduce or eliminate corrosion in the interstitial space, and enables the sensitive monitoring of any leaks in the interstitial space. Preferably the negative pressure is continuous. Also in the preferred embodiment, a negative pressure of approximately −5 inches of mercury is maintained. One or more sensors such as hydrocarbon sensors monitor the interstitial space for checking and reporting leakage. Moreover, sensors may be located to monitor the outer section 12 to check for and report any leakage through the outer section 12.

Figure 6:
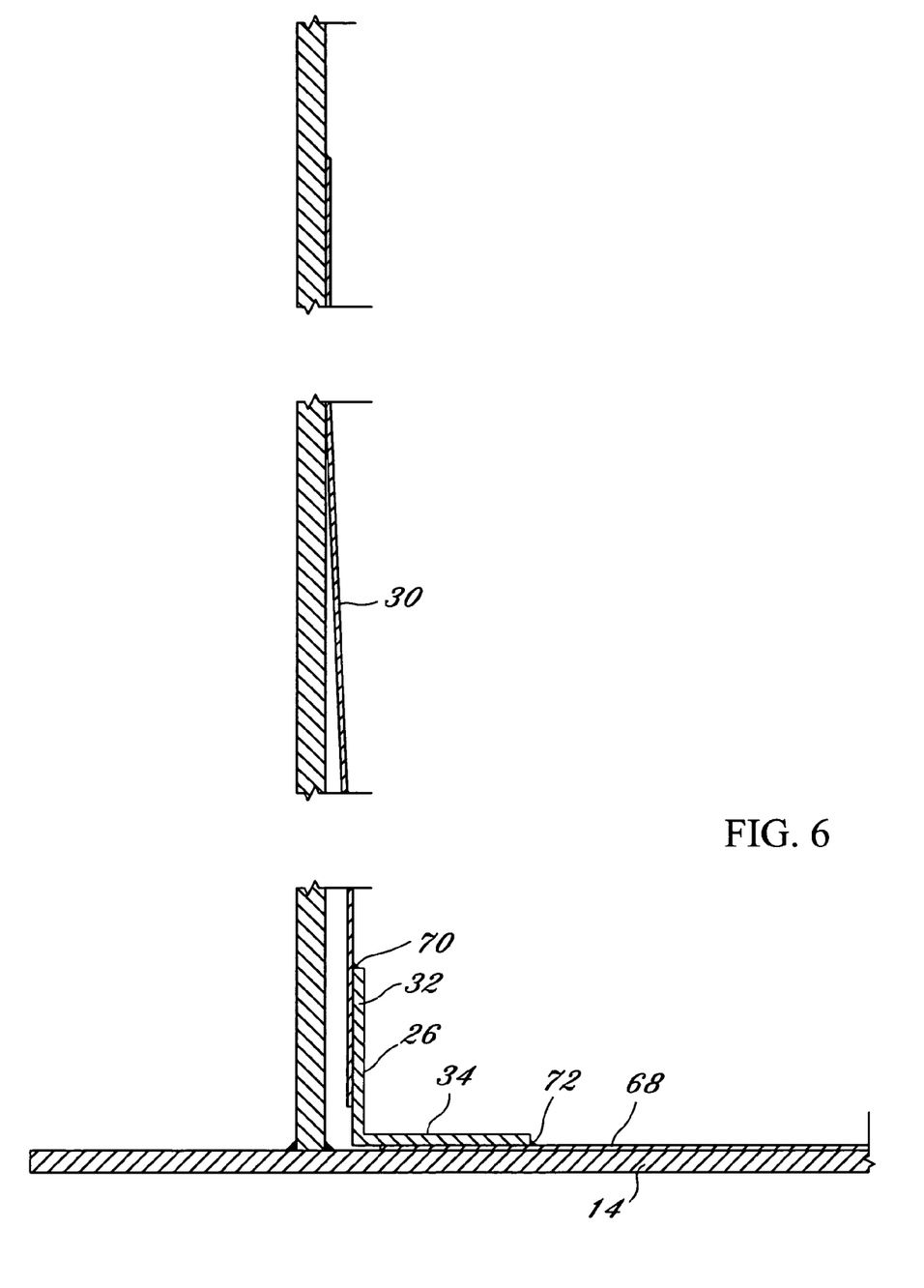
FIG. 6 shows a cutaway view of the perimeter of the preferred embodiment of the system of the invention before bottom plates are overlaid.
Figure 7:
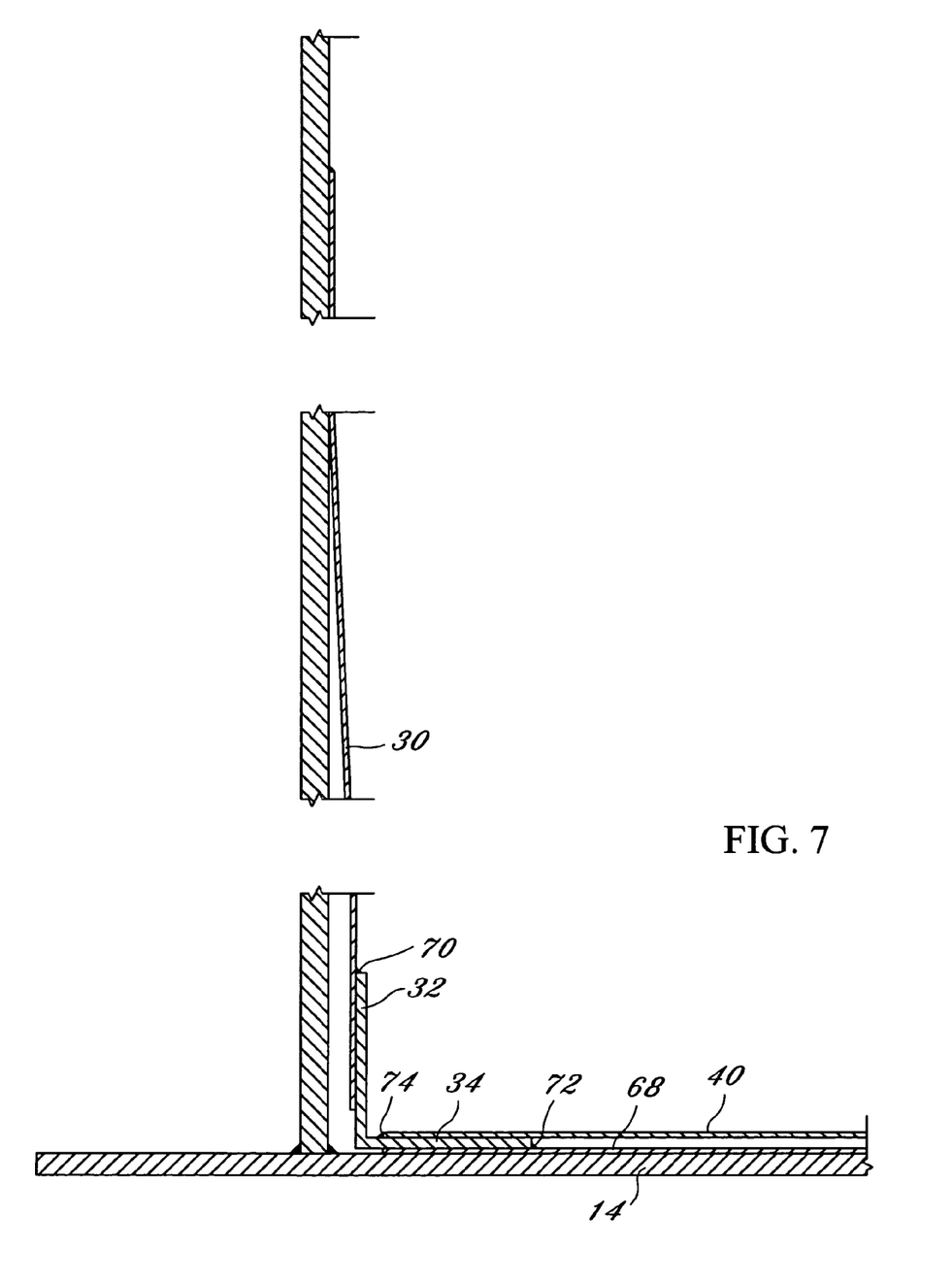
FIG. 7 shows a cutaway view of the perimeter of the preferred embodiment of the system of the invention.

As shown in FIGS. 1, 6 and 7, the inner section 18 includes at least one L-shaped member 24 having a vertical end 32 and a horizontal end 34. For a round tank, a series of these L-shaped members are attached at the sides to form a circle of members 24. Furthermore, the members 24 may be shaped to accommodate the geometry of the outer section 12. However, other geometries for the members 24, and for the connection of members are contemplated for this invention. The L-shaped members are preferably connected by seal welds or equivalent means 2. As shown below, what is needed is a surface for the attachment of flooring and a shell for forming the inner section of the system.

A member 24 is preferably made from rolled steel, although other equivalent materials may be used. Also, it is preferred that the member 24 have dimensions of approximately ¼ inch by 4 inches by 4 inches. These dimensions may vary somewhat depending on the size of the vessel. In one embodiment, the member 24 may be attached to the floor surface 14, as shown in FIG. 1. However, in the preferred embodiment, shown in FIG. 6, the member is preferred to be attached to the skirt 30 of the inner section and flooring 40. Attachment of the member 24 to the flooring 40 is preferably made by seal welding the member 24 at point 38 for the embodiment shown in FIG. 1, although equivalent attachment means may alternatively be used. A seal weld may alternatively be made at points 70 and 72 for the embodiments shown in FIGS. 6 and 7. It is also preferred that a shell skirt 30 as described below is attached to the member 24 at a predetermined height above the joint of the vertical end 32 to the horizontal end 34. For a 44 foot tank, (for example) this height is approximately one half inch above the floor surface, to reduce the likelihood of corrosion.

The skirt 30 of the inner section 18 is preferably steel, such as a 3/16 inch steel plate. In one embodiment, the skirt is attached to the vertical surface 16 of the outer section 12 and the vertical end 32 of the member 24, as shown in FIG. 1. In this embodiment, it is preferred that the skirt 30 is attached by a seal welding at attachment point 36; however, equivalent attachment means are also contemplated. As shown, in this embodiment the skirt 30 overlaps the vertical end 32 of the member 24. The skirt 30 is preferably welded to the vertical section 16 above a predetermined critical height. The preferred height is approximately 6 inches high for a tank of approximately 44 feet in diameter, and the overlap with the member 24 is preferred to be approximately 1.5 inches. The skirt 30 runs up the side of the vertical surface 16. Also, in this embodiment and the other embodiments of this invention, there are hoop stresses which occur for any vessel. It would be preferred that the attachment points of the skirt to the vertical surface 16, as well as those of the member 24, are placed to avoid these stresses, such as above or below the maximum stress points for a particular geometry.

In addition, the inner section 18 further comprises at least one bottom plate 40. In the embodiment in FIG. 1, the bottom plate overlaps the horizontal end 34 of the member 24. However, in the preferred embodiment shown in FIG. 6, the bottom plate or plates 40 lie beneath the member 24. As shown in FIGS. 1, 6 and 7, the skirt 30 and the bottom plate 40 are attached to the member 24 by a means such as a seal weld at 38. Although a single weld is shown, other attachment means are also contemplated. A plurality of L-shaped members 24 and skirts 30 preferably generally travel around the inside perimeter of the outer section 12.

Figure 2:
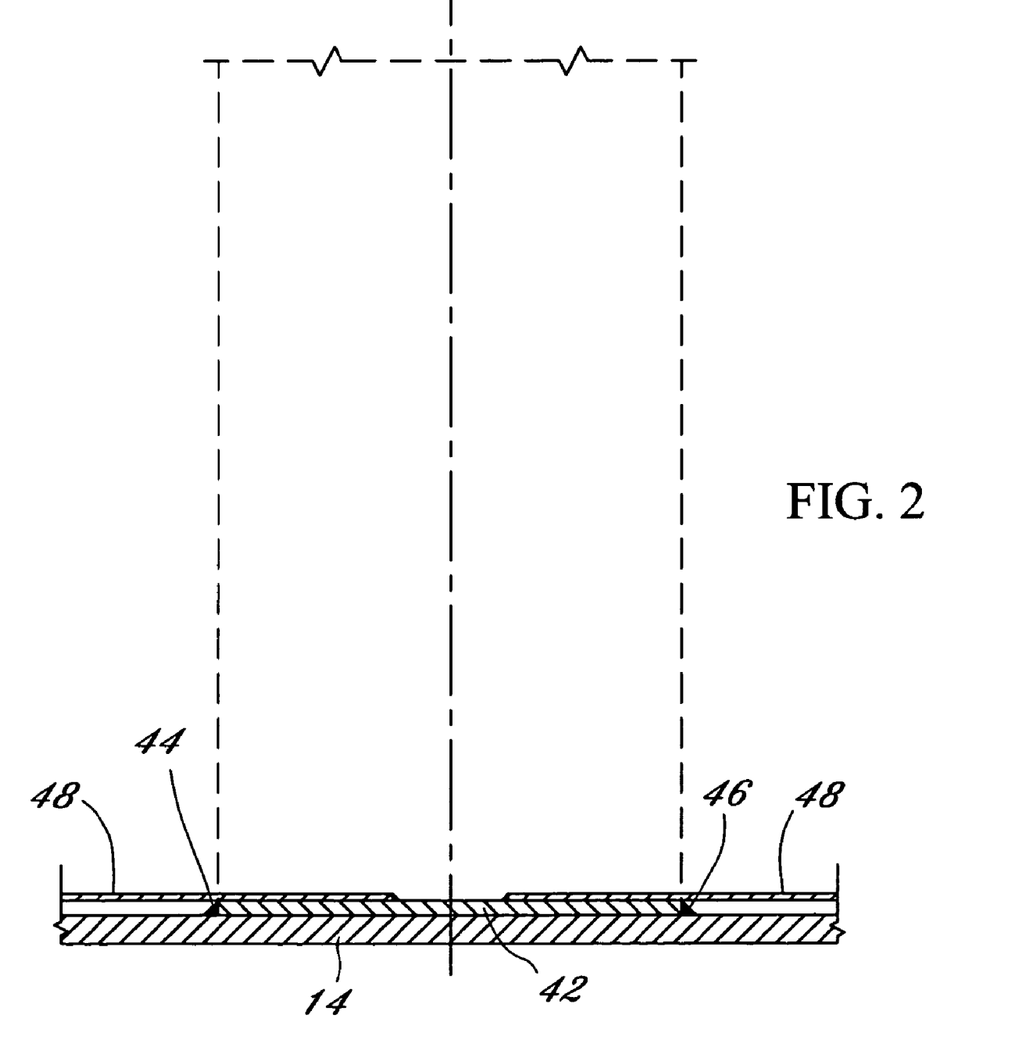
FIG. 2 shows a center cutaway elevation view of the system of the invention.
Figure 3A:
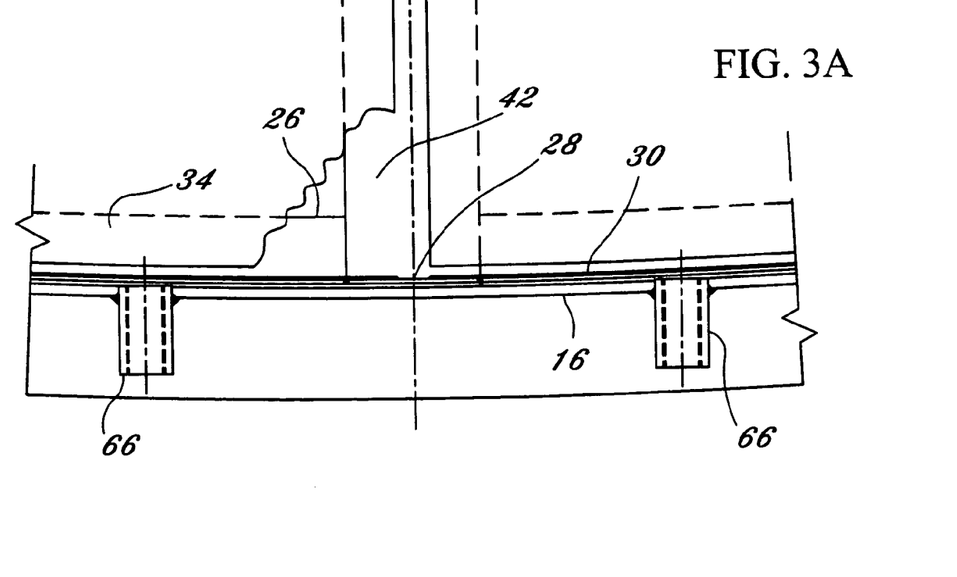
FIG. 3A shows a cutaway plan view at the dividing plate of the system of the invention.
Figure 3B:
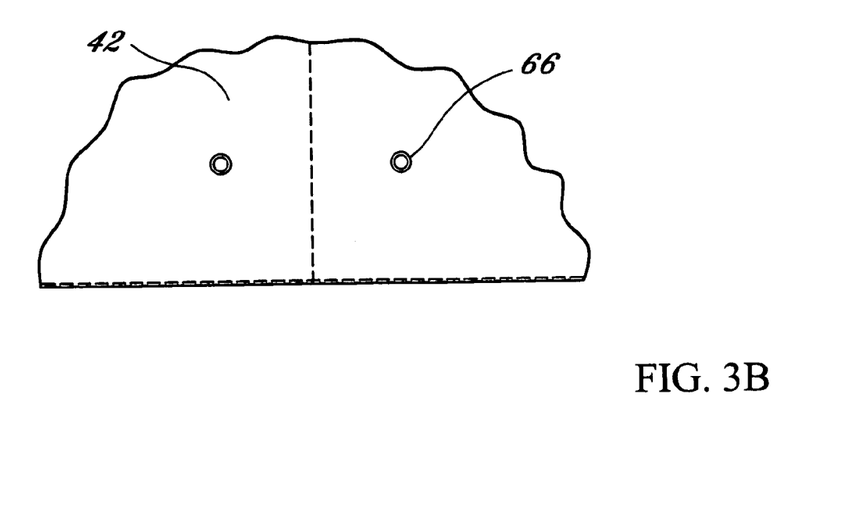
FIG. 3B shows a cutaway elevational view at the dividing plate of the system of the invention.
Figure 5:
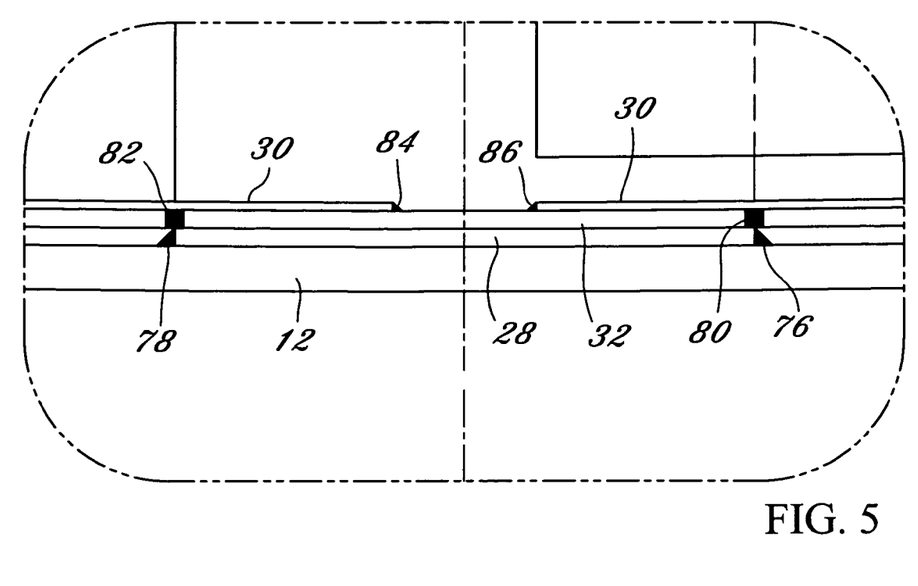
FIG. 5 shows a welding detail of the cutaway plan view at the dividing plate of the invention.

In the preferred embodiment, the perimeter is preferably bisected by a divider plate 42, illustrated in FIGS. 2,3 and 5, although more or less than two divided zones may be used. The divider plate 42 is gas permeably attached on one side of the floor surface 14 and impermeably attached on the other side. A stitch weld is preferred for permeable attachment at 44 and a seal weld is preferred for impermeable attachment at 46. New floor plates 48 are overlaid an original flooring to the tank preferably and sealingly attached, so that the system 10 comprises two independently sealed interstitial space sections divided by the divider plate 42. The divider plate 42 is preferably ¼ inch by 4 inches by 44 feet for a vessel of approximately 44 feet in diameter. However, varying widths may be used depending upon the diameter of the tank.

It is preferred that the divider plate 42 is rolled up 90 degrees on each end, thereby producing two vertical ends 28 to the divider plate 42. As shown in FIG. 3, the rolled up end of the divider plate 42 is welded to the vertical section 16 of the outer section 12. However, other means of attachment, such as a composite such as fiberglass and epoxy, may be preferred for certain applications.

It is preferred that the coupling attachment for the divider plate 42 to the vertical section 16 is a seal weld. Also, where two vacuum couplings 66 are used, as shown in FIGS. 3A and 3B, it is preferred that the couplings for the vacuum are each centered around the centerline of the rolled up end of the divider plate. The preferred distance for a 44 foot diameter tank is approximately 8 inches.

In the embodiment in FIG. 1, the L-shaped member 24 is attached to the bottom surface 14. The divider plate, if used is attached to adjacent members 24. Bottom plates 40 are overlaid the members and the divider plate. The short pieces are then attached to the members 24.

In the embodiment in FIG. 7, a flooring layer is overlaid the bottom surface 16, and bottom plates are attached to the top surface 34 of the member 26.

In the preferred embodiment, shown in FIG. 6, the system 15 is deployed as follows. The divider plate, or plates are laid, with the rolled up ends attached to the vertical surface 16, L-shaped members 26 are overlaid the divider plate and placed around the inner circumference of the outer portion 12. Bottom plates 40 are overlaid the divider plate 42 and the horizontal sections 34 of the L-shaped members 26. As shown in FIG. 2, bottom plates over the divider plate 42 preferably do not overlap. The skirt 30 is then attached to the vertical section 12 and the vertical portions of the L-shaped members 26. It is to be understood that the order of placement of the elements can be altered without changing the final configuration.

In this embodiment, the need for an upside down weld between the vertical end 32 of the member 26 and the skirt 30 is eliminated. Thus, the installation is easier. However, that would be needed for the embodiments in FIGS. 1 and 7. It may preferred for some uses that new flooring 68 consisting of bottom plates 40 is overlaid the original floor surface 14, as shown in FIG. 7.

It is preferred that the bottom plates comprise approximately 3/16 inch thick steel plates. The vertical end 32 of the member 26 is seal welded to the skirt 30 and the horizontal end 34 is seal welded to the new flooring 68 at points 70 and 72. Several divider plates 42 may be used in the system, so long as one side is permeably attached to the bottom surfaces, and the other side is impermeably attached. The divider plates 42 can be in parallel orientation, perpendicular orientation or other shapes, thereby providing several zones where interstitial space has a negative pressure. When used in this manner, the system allows for the narrowing down of the location of a leak so that repair can be made quickly and with a reduced amount of materials and labor. Also a buffer lining for preventing corrosion of material known in the art may be placed over the bottom plates. The vertical surface 16 is welded to the rolled up portion of the divider plate. The divider plate is then welded to the L-shaped member. The L-shaped member is then welded to the skirt.

The preferred welding plan at each vertical end 28 of the divider plate 42 is illustrated at FIG. 5. The divider plate 42 is seal welded to the vertical section 16 of the outer section 12 at 76,78. The vertical end 32 of the member 26 is seal welded on each side 80, 82. Steel skirts 30 are each seal welded to the vertical end 32 of the member 28 at 84,86. Other equivalent attachment means are also contemplated. Although not shown in FIG. 5, the skirt 30 may overlap the member 24 at this location.

It is also contemplated that divider plates 42 of other geometry separate the system 10 into more separate independent interstitial spaces. Monitoring ports 66 as shown in FIG. 3 are preferably provided through the outer portion of each divided section. The monitoring ports 66 are in contact with the one or more interstitial spaces between the outer portion 12 and the inner portion 18 of the system 10. Sensors within the ports 66 are then able to monitor and report leakage into the interstitial space. One or more additional monitoring ports, or sensors alone, may be located under the floor surface 14 to monitor and report leakage under the entire system 10. The seals such as the seal welds described herein provide the strength to allow a high negative pressure in the interstitial spaces so that the sensors are especially responsive. Furthermore, the high negative pressure provides an environment within the system which is resistant to corrosion.

Bottom plates 40 are attached to the divider plate 42 located on the floor surface 14 of the outer section 12 are at an overlap as shown in FIG. 2. It is preferred that the overlap of the bottom plates 40 with the divider plate 42 is approximately 1.5 inches.

It is also preferred that bottom plates are staggered so that connecting seal welds generally are not in a straight line. However, in an alternative embodiment, bottom plates over the floor surface 14 of the outer section 12 are placed in an array as shown generally at 50 in FIG. 4. As shown, uncut plates 52 are placed toward the center of the system 10. Cut plates 54a,54b are shaped to fit the perimeter of the array and placed around uncut plates 52.

Figure 4:
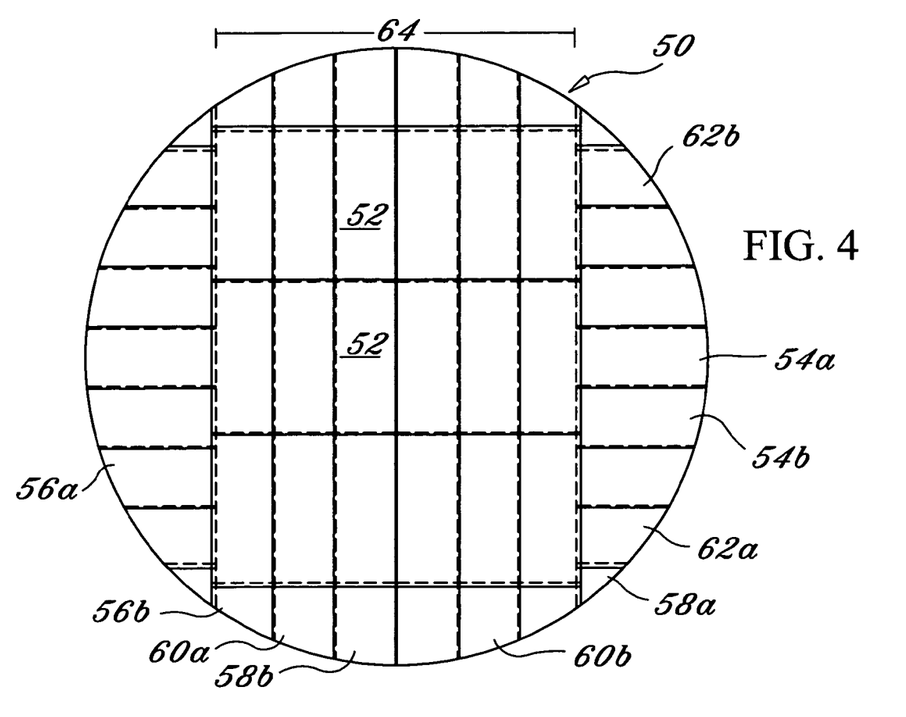
FIG. 4 shows the preferred plate layout of the system of the invention.

A single plate can be cut to provide two differently shaped pieces, such as the plates marked 56a,56b and 58a,58b. In addition, two similarly shaped plates may be formed from a single plate, such as those marked 60a,60b and 62a,62b. Having the same cut made twice on the same plate to make shaped plates reduces manufacturing time and cost. Also, having standard cuts made from a standard sized plate such as the uncut plate 52 further reduces manufacturing time and cost. Other combinations of cuts of plates to form the desired array are also contemplated.

The bottom plates preferably overlap one another. In the embodiment illustrated in FIG. 4, the uncut sheets 52 have approximately 1.5 inch overlap over one another, and the sheets along the perimeter have approximately 3.5 inch overlap. However, as discussed above, plates adjacent to the divider plate overlap the divider plate. The overlapping plates are preferably attached to the lower plate by seal welds.

In the embodiment shown in FIG. 7, one or more bottom plates 40 are overlaid the horizontal end 34 of the member 26 as described above. It is preferred that the bottom plates 40 are attached by seal welding in this embodiment as well.

Figure 8:
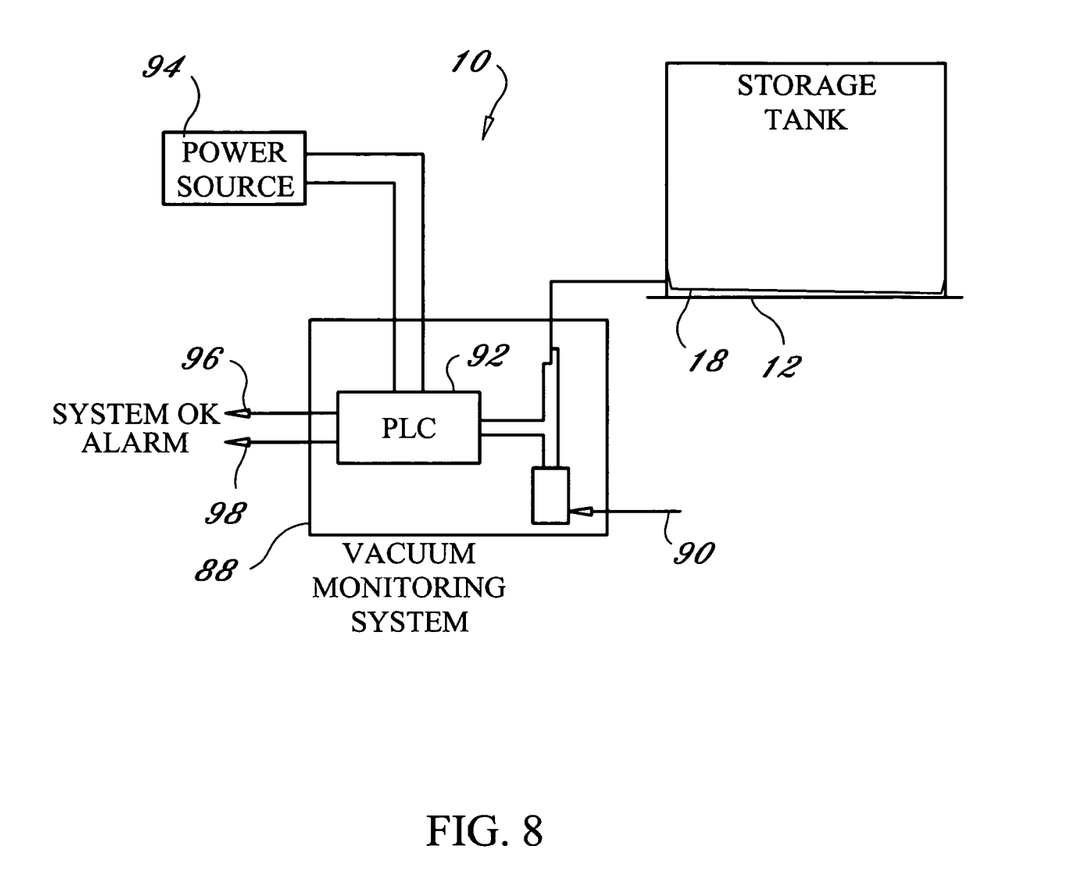
FIG. 8 shows a schematic view of the system of the invention including the vacuum monitoring system.

In FIG. 8, a schematic diagram of the system 10 including the vacuum monitoring system 88 is shown. In the embodiment shown, the storage tank including the system 10 has an interstitial space between the inner section 18 and the outer section 12. A vacuum pump 90 maintains vacuum within the interstitial space. The vacuum monitoring system 88 is controlled by a programmable logic controller (PLC) 92. The PLC is in communication with a power source 94. Preferably, the power source 94 is approximately 120 volts alternating current which is converted to 24 volts of direct current, to be compliant with National Electrical Code requirements. However, other means of powering the pump 90 are also contemplated. The PLC 92 then monitors the level of vacuum in the interstitial space, and provides output indicating that the system 10 is functioning properly 96, or that a leak has occurred 98.

It is preferred that a constant vacuum of approximately 5 inches Hg is maintained in the interstitial space. If the space develops a leak, vacuum pressure in the interstitial space drops. As the pressure begins to drop, the vacuum pump will start and attempt to bring the vacuum back to the set pressure. Some fluctuation in pressure is normal for reasons such as atmospheric conditions. However, in the preferred embodiment, the PLC 88 will trigger the alarm where the vacuum has been triggered more often than normal, the pump cannot bring the pressure to the proper value after a pre-set amount of time, or other conditions according to the preference of the user. The vacuum pump 90 preferably can be reset with a simple reset button.

Figure 9:
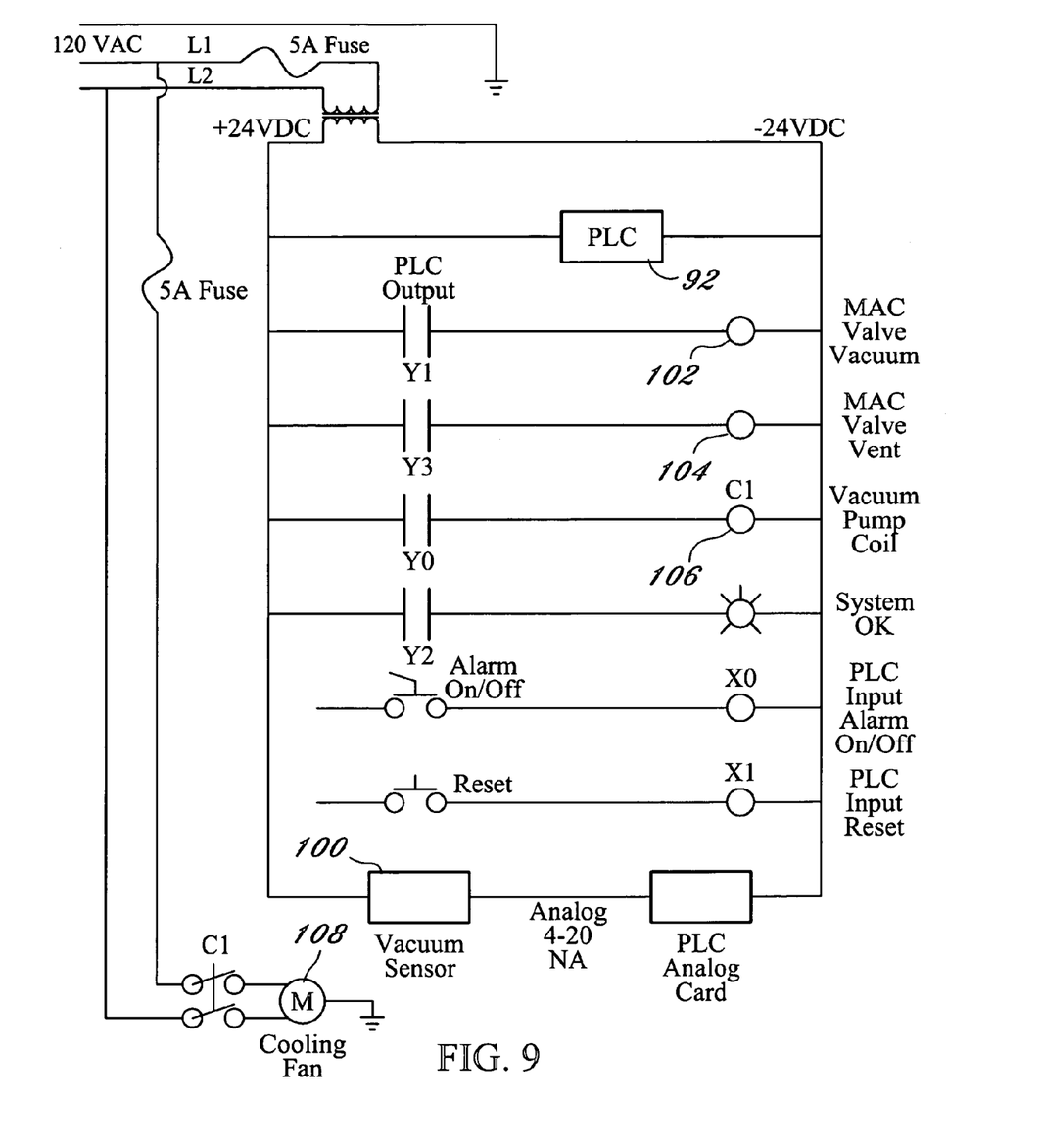
FIG. 9 shows a schematic view of the vacuum leak detection system of the present invention.

A schematic diagram of the vacuum leak detection system is shown in FIG. 9. As shown, the components include a vacuum sensor 100 and a vacuum pump 102, including a vent 104 and a vacuum pump coil 106, which are in communication with the PLC 92. A cooling fan 108 is preferably used to keep the detection system from overheating.

In the preferred embodiment, a pressure transducer sends a 4-20 ma signal to the PLC. The preferred vacuum pump is capable of pumping approximately 10 cubic inches per minute. However, since this power is likely insufficient to bring the pressure down to an operational level in a reasonable amount of time, a larger pump may be desired to obtain a pressure whereby the system pump may be used efficiently. In an alternative embodiment, the system is shut off only by disconnecting the power source.

Also in the preferred embodiment, after the system is installed, a high level vacuum is imposed upon the interstitial space and held for an extended amount of time during which the vacuum level can be monitored for minute changes. Vacuum loss sources are sought and if found, they are eliminated. Upon satisfactory testing of the system, vacuum is preferred to be used to remove all moisture and oxygen. An inert gas such as nitrogen is preferably introduced to provide a dry, inert atmosphere which reduces the potential for corrosion, thereby extending the life of the system. The values for the electronic components as shown in FIG. 9 are those which are preferred. However, they are considered approximate values and other values are contemplated by this invention. Similarly, equivalent architecture for the vacuum leak detection system electronics are also contemplated by this invention.

Furthermore, in another embodiment, this system provides a means, such as tubing, for flushing out the interstitial space with an agent such as a detergent of a leak is detected. A leak may be automatically flushed upon detection by one or more sensors, or a user may deploy the flushing system. A separate flushing means may be placed under one or more of several independently isolated sections. Thus the send pad that is generally found under the storage tanks is no longer needed.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A lining system for a fluid containment vessel comprising:
    an inner section including a tank divider plate; and
    an outer section including a floor surface, wherein
    the inner section is attached to the outer section,
    interstitial space exists between the outer section and the inner section,
    the tank divider plate is sealingly attached to the floor surface on one side of the tank divider plate, and
    the tank divider plate is gas permeably attached to the floor surface on another side of the tank divider plate.

* * * * *